US008913032B2

(12) United States Patent
Kikuchi

(10) Patent No.: US 8,913,032 B2
(45) Date of Patent: Dec. 16, 2014

(54) POSITION INFORMATION CORRECTION DEVICE, POSITION INFORMATION CORRECTION METHOD, AND PROGRAM

(75) Inventor: Naoki Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 13/404,653

(22) Filed: Feb. 24, 2012

(65) Prior Publication Data

US 2012/0235952 A1    Sep. 20, 2012

(30) Foreign Application Priority Data

Mar. 18, 2011  (JP) ................. 2011-060590

(51) Int. Cl.
| | | |
|---|---|---|
| *G06F 3/045* | (2006.01) | |
| *G06F 3/041* | (2006.01) | |
| *G06F 3/044* | (2006.01) | |

(52) U.S. Cl.
CPC .............. *G06F 3/0418* (2013.01); *G06F 3/044* (2013.01)
USPC ........................................... 345/174; 702/94

(58) Field of Classification Search
CPC ..................................................... G06F 3/0488
USPC ..................................... 345/173–183; 702/94
See application file for complete search history.

(56) References Cited

U.S. PATENT DOCUMENTS

| | | | | |
|---|---|---|---|---|
| 2010/0328256 A1* | 12/2010 | Harada et al. | ................. | 345/174 |
| 2011/0234508 A1* | 9/2011 | Oda et al. | ..................... | 345/173 |

FOREIGN PATENT DOCUMENTS

JP    2010-250770    11/2010

\* cited by examiner

*Primary Examiner* — Kevin M Nguyen
*Assistant Examiner* — Kenneth B Lee, Jr.
(74) *Attorney, Agent, or Firm* — Sony Corporation

(57) ABSTRACT

There is provided a position information correction device including an input point acquisition section which acquires position information of an input point specified by an operating object, a direction detection section which detects a movement direction of the operating object based on displacement of the position information acquired by the input point acquisition section for each input point, a determination section which takes a majority vote of the movement directions of past input points acquired by the input point acquisition section in the past, and determines the movement direction of the operating object with respect to a current input point acquired by the input point acquisition section at a current time point, and a position information correction section which, when the movement direction detected by the direction detection section differs from the movement direction determined by the determination section, corrects position information of the current input point.

13 Claims, 16 Drawing Sheets

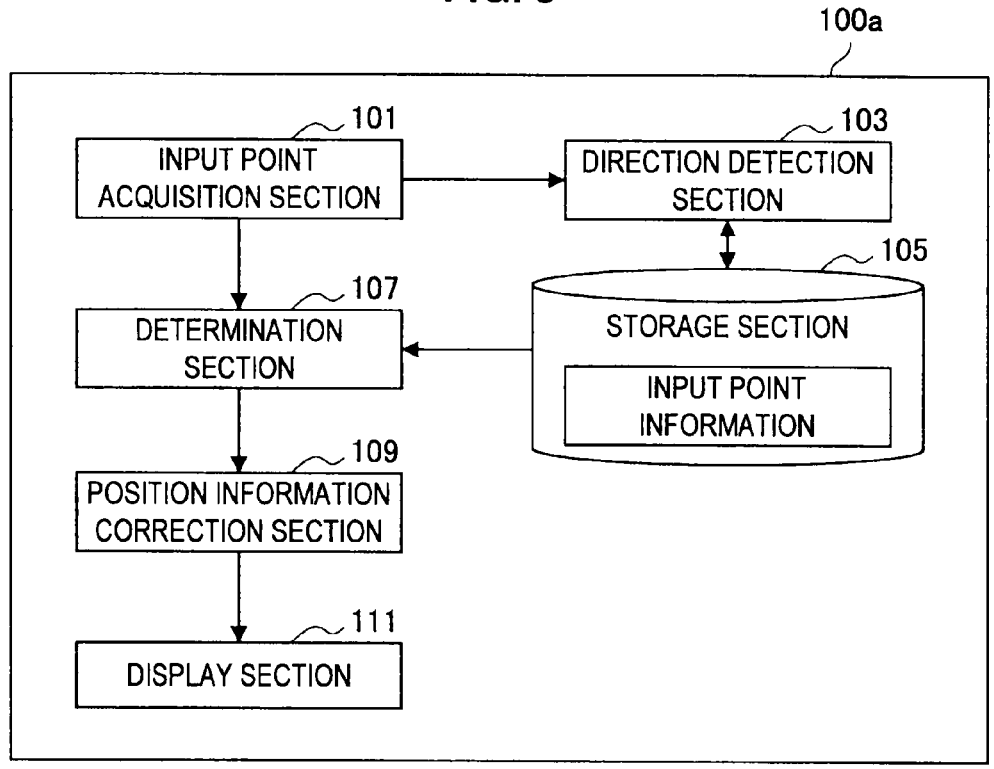
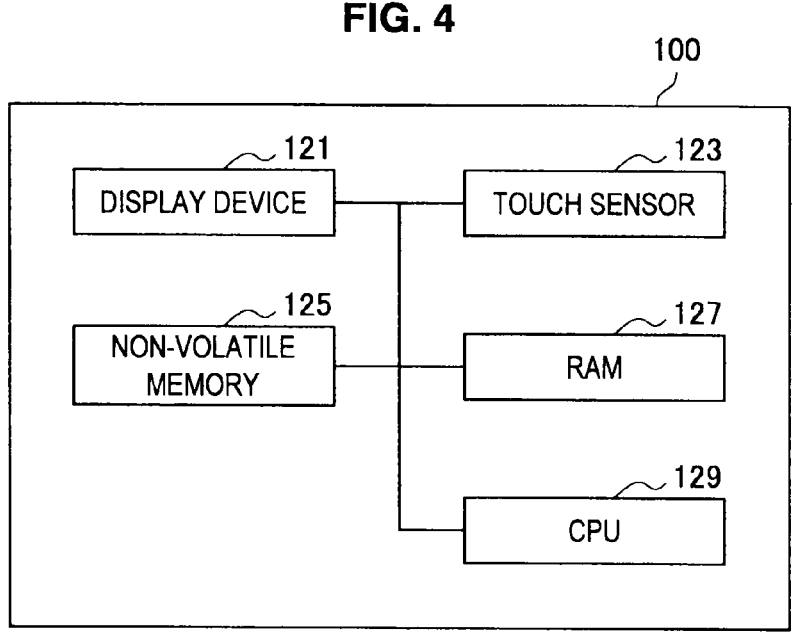

FIG. 16
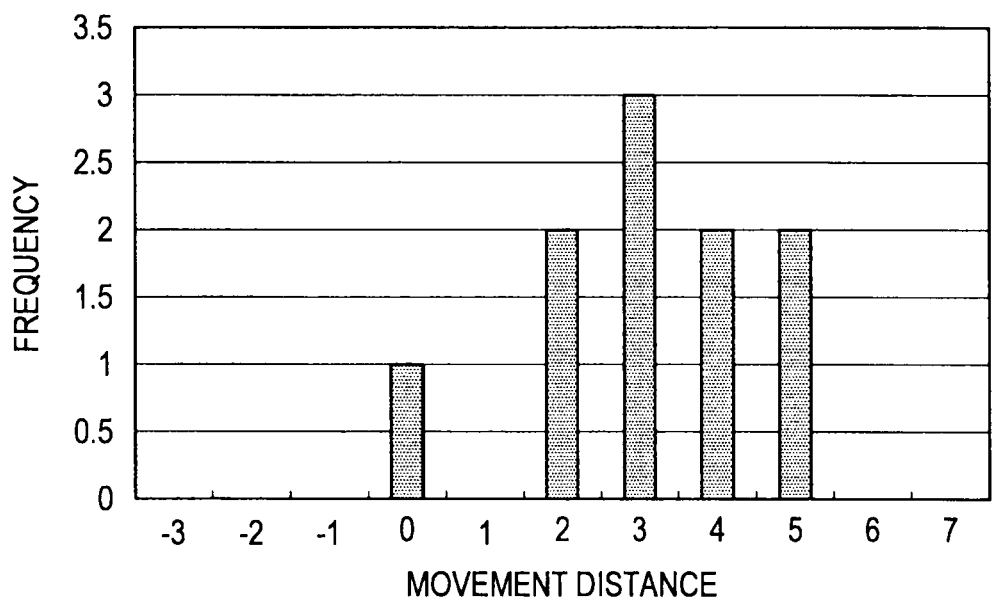
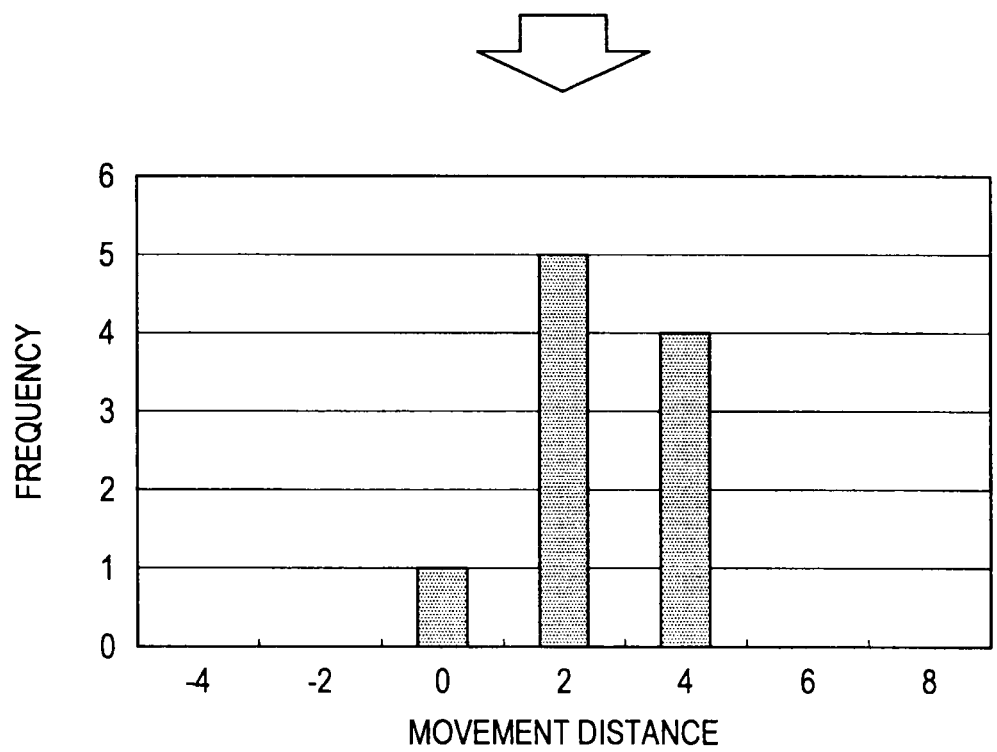

POSITION INFORMATION CORRECTION DEVICE, POSITION INFORMATION CORRECTION METHOD, AND PROGRAM

BACKGROUND

The present disclosure relates to a position information correction device, a position information correction method, and a program, and particularly relates to a position information correction device, a position information correction method, and a program, which are for correcting position information specified by a pointing device.

In recent years, a pointing device has been in widespread use, as an input device of an information processing apparatus including a PC (Personal Computer) and a smartphone, for example. Examples of the pointing device include a touch panel, a touch pad, a mouse, and a TrackPoint. The pointing device detects position information of an input point specified by a position of an operating object (for example, refer to JP 2010-250770A).

SUMMARY

The position information of the input point which is input by the pointing device includes a noise component that is caused by various factors. Accordingly, there were some cases in which, even though the user meant to perform operation in a fixed direction using the operating object, the operation information of the opposite direction from the intended direction was input.

In light of the foregoing, it is desirable to provide a position information correction device, a position information correction method, and a program, which are novel and improved, and which are capable of correcting the input position information based on a movement direction.

According to an embodiment of the present disclosure, there is provided a position information correction device which includes an input point acquisition section which acquires position information of an input point specified by an operating object, a direction detection section which detects a movement direction of the operating object based on displacement of the position information acquired by the input point acquisition section for each input point, a determination section which takes a majority vote of the movement directions, which are detected by the direction detection section, of past input points acquired by the input point acquisition section in the past, and determines the movement direction of the operating object with respect to a current input point acquired by the input point acquisition section at a current time point, and a position information correction section which, when the movement direction detected by the direction detection section differs from the movement direction determined by the determination section, corrects position information of the current input point.

According to such a configuration, the movement direction of the operating object is determined by taking a majority vote among movement directions of input points of the past. The movement direction is a direction estimated by a majority vote based on movement directions of the past of the operating object. Accordingly, even in the case where a noise component is included in the position information of the input point, the position information can be corrected to the position to which the intention of the user operating the operating object is reflected.

According to another embodiment of the present disclosure, there is provided a position information correction method which includes acquiring position information of an input point specified by an operating object, detecting a movement direction of the operating object based on displacement of the acquired position information for each input point, taking a majority vote of the detected movement directions of past input points acquired in the past, and determining the movement direction of the operating object with respect to a current input point acquired at a current time point, and correcting position information of the current input point when the detected movement direction differs from the determined movement direction.

According to another embodiment of the present disclosure, there is provided a program for causing a computer to function as a position information correction device which includes an input point acquisition section which acquires position information of an input point specified by an operating object, a direction detection section which detects a movement direction of the operating object based on displacement of the position information acquired by the input point acquisition section for each input point, a determination section which takes a majority vote of the movement directions, which are detected by the direction detection section, of past input points acquired by the input point acquisition section in the past, and determines the movement direction of the operating object with respect to a current input point acquired by the input point acquisition section at a current time point, and a position information correction section which, when the movement direction detected by the direction detection section differs from the movement direction determined by the determination section, corrects position information of the current input point.

According to the embodiments of the present disclosure described above, there can be provided the position information correction device, the position information correction method, and the program, which are novel and improved, and which are capable of correcting the input position information based on the movement direction.

BRIEF DESCRIPTION OF THE DRAWINGS

FIG. 3 is a functional block diagram of a position information correction device according to a first embodiment of the present disclosure;

FIG. 4 is a hardware configuration diagram of the position information correction device according to the first embodiment and a second embodiment;

FIG. 16 is an explanatory diagram showing an example of the movement distance determination using a majority vote in the example of FIG. 15;

DETAILED DESCRIPTION OF THE EMBODIMENT(S)

Figure 1:
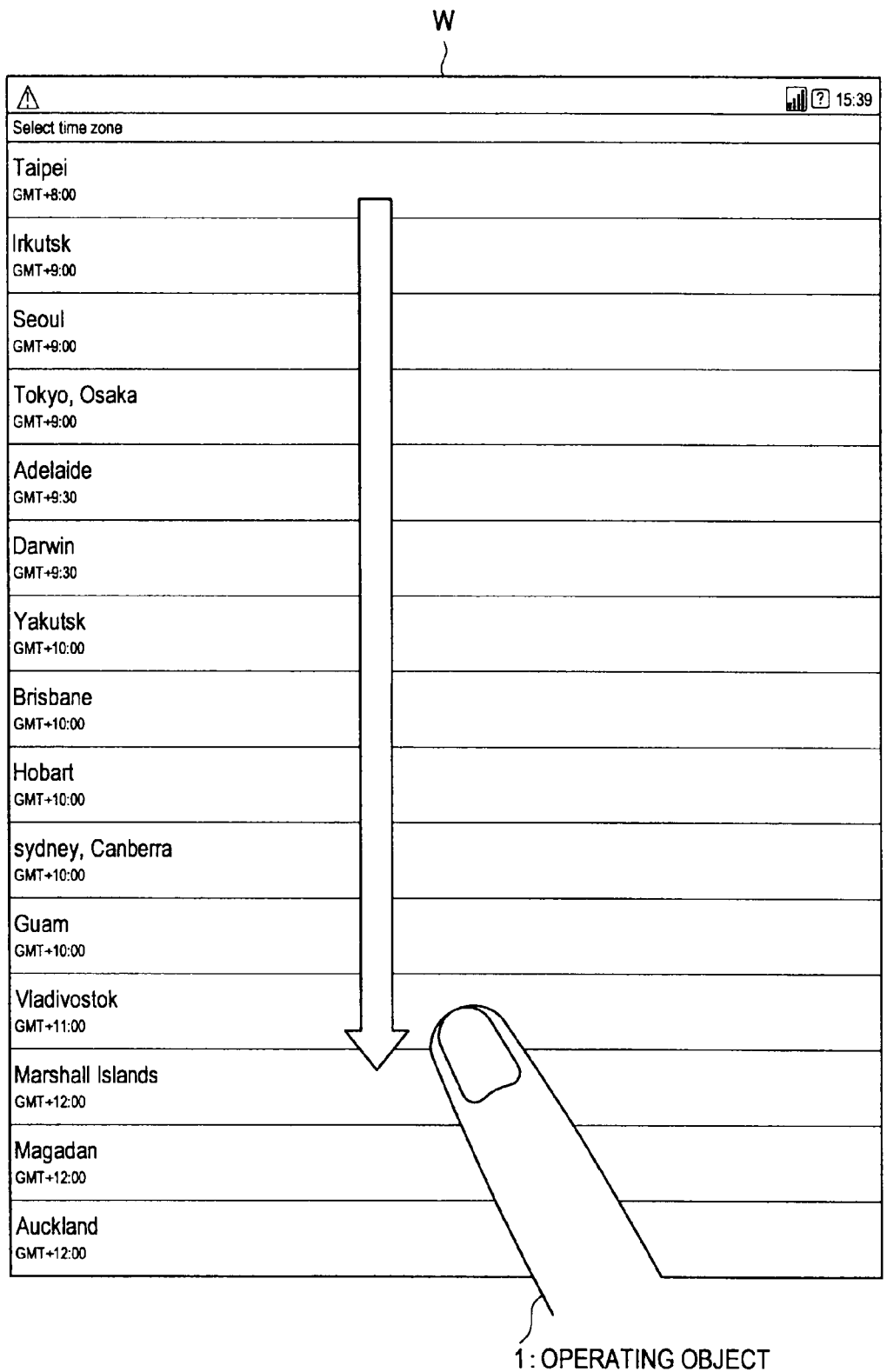
FIG. 1 is an explanatory diagram showing an example of operation to a touch sensor.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Outline
2. First embodiment
  2.1. Configuration example of position information correction device 100a
  2.2. Operation example of position information correction device 100a
  2.3. Examples of effects
3. Second embodiment
  3.1. Configuration example of position information correction device 100b
  3.2. Operation example of position information correction device 100b
  3.3. Examples of effects
4. Third embodiment
  4.1. Configuration example of position information correction device 100c
  4.2. Operation example of position information correction device 100c
  4.3. Examples of effects

1. Outline

Figure 2:
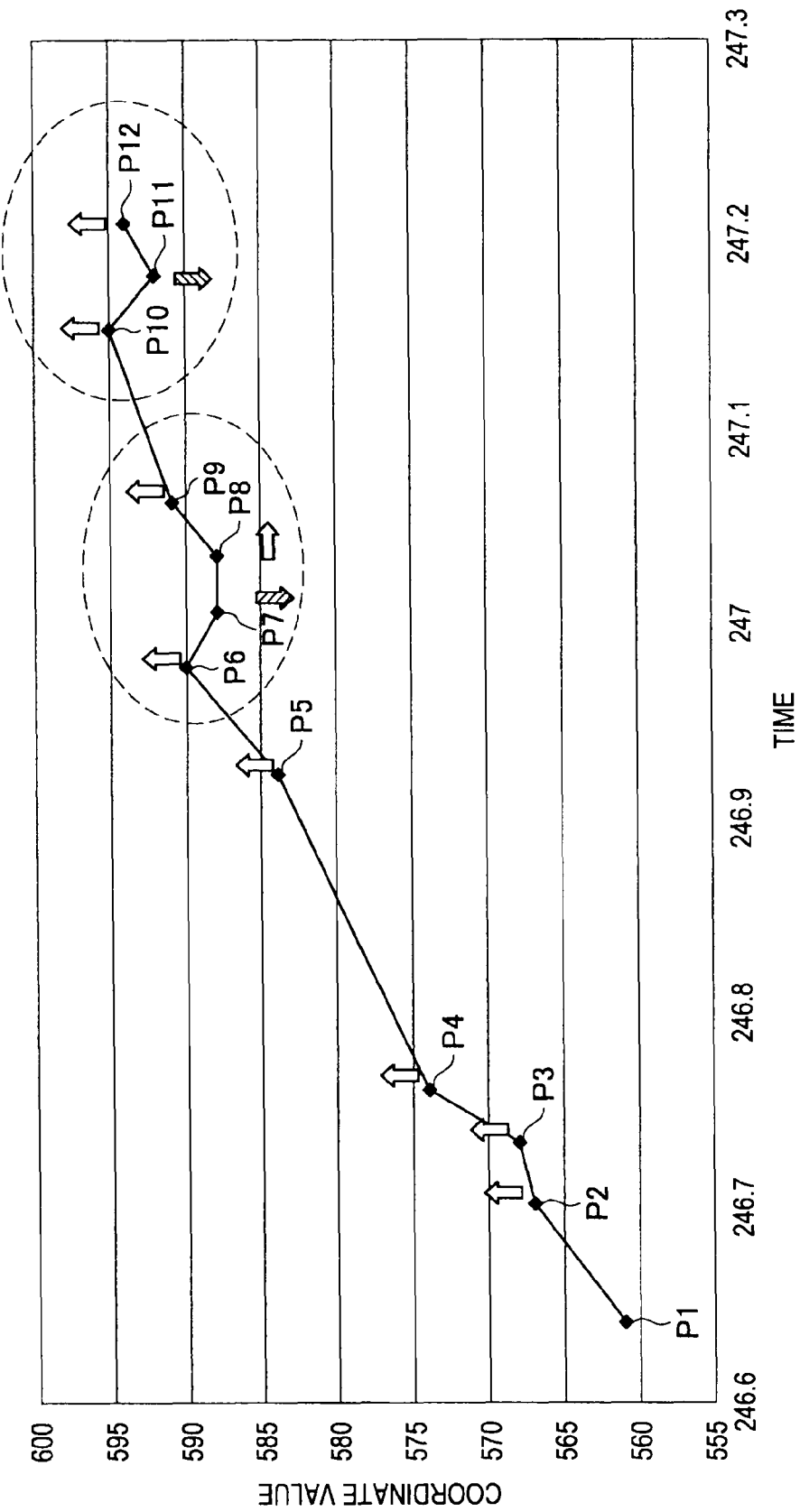
FIG. 2 is a graph showing an example of position information to be detected.

First, with reference to FIG. 1 and FIG. 2, a touch sensor is exemplified as a pointing device that the present disclosure aims at, and an outline of the present disclosure will be described. FIG. 1 is an explanatory diagram showing an example of operation to a touch sensor. FIG. 2 is a graph showing an example of position information to be detected.

Let us assume that, to an operation screen W shown in FIG. 1, an operation along the arrow is performed with an operating object 1. Note that the operation screen W is a screen for inputting an operation to the touch sensor, and there is assumed a screen in which display contents are scrolled in a manner that they follow the operating object 1 moved in a fixed direction such as a direction of the arrow.

In the case where the scroll operation is performed by the operating object 1, position information shown in FIG. 2 is detected, for example. FIG. 2 shows a relationship between the detected time and the coordinate value of each of 12 input points P1 to P12 which are detected during the scroll operation. Here, the coordinate value represents a position on the axis indicating the vertical direction of the operation screen W shown in FIG. 1. Further, the arrow shown in the vicinity of each point P represents the movement direction based on a displacement (difference of coordinate value with the point detected in the previous time) of the position information. Even though a user means to perform the operation in a fixed direction, a noise component is included in the detected position information. In the case of FIG. 2, all input points should each be moved in the direction that the coordinate value increases. However, among the detected input points P, there are included input points (input points P7, P8, P11, and P12) each having a coordinate value smaller than that of the input point detected in the previous time or a coordinate value that is the same as that of the input point detected in the previous time. In particular, in the case where the movement speed of the operating object 1 is small, the influence of the noise component becomes large, since the displacement of position information per unit time is small.

There are various factors in inclusion of the noise component in the position information. For example, there is a case in which noise is included caused by device characteristics of the pointing device. In the case of the touch sensor, for example, a position can be detected with higher accuracy as the resolution becomes higher. On the other hand, it is more likely that the noise component is included in the position information as the resolution becomes lower. Further, a capacitive touch sensor is an input device which detects a touch position based on the change in the capacitance of a plurality of electrodes, and the detection accuracy lowers at a grid boundary part. Further, the capacitive touch sensor has a property that, comparing the peripheral part of the touch sensor with the central part of the touch sensor, the noise component is more easily included in the peripheral part.

Due to the influence of noise component, there are some cases where, when position information that is displaced in the opposite direction to the intended direction, a reverse movement phenomenon occurs in which feedback of the opposite direction to the intended direction (for example, scroll operation to the opposite direction) is given. Accordingly, in order to eliminate the influence of noise component, the position information correction device according to an embodiment of the present disclosure determines the direction intended by the user who operates the pointing device, and corrects the detected position information based on the determined direction. Hereinafter, three embodiments are given and the position information correction device will be described.

2. First Embodiment

2.1. Configuration Example of Position Information Correction Device 100a

First, with reference to FIG. 3 and FIG. 4, a position information correction device 100a according to a first embodiment of the present disclosure will be described. FIG. 3 is a functional block diagram of a position information correction device according to the first embodiment of the present disclosure. FIG. 4 is a hardware configuration diagram of the position information correction device according to the first embodiment and a second embodiment.

Further, in this specification and the appended drawings, there are some cases where multiple structural elements that have substantially the same function and structure are distinguished from one another by being denoted with different alphabets after the same reference numerals. For example, multiple structural elements that have substantially the same function and structure are distinguished from one another as necessary, like a position information correction device 100a and a position information correction device 100b. Note that, in the case where it is not necessary to distinguish the multiple structural elements that have substantially the same function and structure from one another, the multiple structural elements are denoted with the same reference numeral only. For example, in the case where it is not particularly necessary to distinguish the position information correction device 100a, the position information correction device 100b, and the like from one another, they are each simply referred to as position information correction device 100.

First, referring to FIG. 3, a functional configuration of the position information correction device 100a will be described. The position information correction device 100a has a function of correcting position information input via a pointing device. The position information correction device 100a mainly includes an input point acquisition section 101, a direction detection section 103, a storage section 105, a determination section 107, a position information correction section 109, and a display section 111.

The input point acquisition section 101 has a function of acquiring position information (for example, coordinate value) of an input point specified by an operating object 1. Here, the operating object 1 represents a pointing device or an object for operating the pointing device (for example, a finger operating a touch sensor), for example. The input point acquisition section 101 can supply the direction detection section 103 with the acquired position information.

The direction detection section 103 has a function of detecting the movement direction of the operating object 1 based on the displacement of the position information acquired by the input point acquisition section 101, for each detected input point. The direction detection section 103 can acquire, as the movement direction of the operating object 1, the direction of change of the position information of the current input point acquired by the input point acquisition section 101 at the current time point from the position information of the previous input point detected immediately prior to the current input point. The direction detection section 103 stores, in the storage section 105, the detected movement direction together with the position information of the corresponding input point.

The storage section 105 has a function of storing data. The storage section 105 may be, for example, a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). In the present embodiment, the storage section 105 can store the input point information, which is a history of the position information of the input point acquired by the input point acquisition section 101.

The determination section 107 takes a majority vote of movement directions, which are detected by the direction detection section 103, of past input points acquired in the past. Then, the determination section 107 can determine the direction with the most votes as the movement direction of the operating object 1 with respect to the current input point detected at the current time point. For example, in this case, the determination section 107 may use pieces of movement direction information of a predetermined number of past input points counted from the latest input point.

The position information correction section 109 has a function of correcting the position information of the current input point in the case where the movement direction detected by the direction detection section 103 differs from the movement direction determined by the determination section 107. In this case, the position information correction section 109 can correct the position information of the current input point based on the position information of the previous input point that is acquired immediately prior to the current input point. The position information correction section 109 can correct the position information of the current input point such that the position information of the current input point becomes equal to the position information of the previous input point. Alternatively, the position information correction section 109 can correct the position information of the current input point such that the position information of the current input point moves to the movement direction-side from the previous input point, the movement direction being determined by the determination section 107. In this case, the position information correction section 109 may correct the position information of the current input point by estimating the position of the current input point based on movement history of the input point.

The display section 111 includes a display device and a display control section which generates a display screen to be displayed by the display device, for example, and has a function of providing the user with the display screen. The display section 111 can display the screen based on the position information corrected by the position information correction section 109.

Heretofore, an example of the functions of the position information correction device 100a according to the present embodiment has been described. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the position information correction device 100a according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

Next, with reference to FIG. 4, an example of a hardware configuration of the position information correction device 100 according to first to third embodiments of the present disclosure will be described.

The position information correction device 100 mainly includes a display device 121, a touch sensor 123, a non-volatile memory 125, a RAM (Random Access Memory) 127, and a CPU (Central Processing Unit) 129. The display device 121 and the touch sensor 123 may be provided in a stacked manner.

The display device 121 is an example of an output device which outputs information. The display device 121 may be, for example, a liquid crystal display (LCD) device and an organic EL display (organic light emitting diode (OLED)) device.

The touch sensor 123 is an example of the pointing device, is provided in a stacked manner on the display device 121, and is a position detection device which detects the position of the operating object that comes into contact with or comes close to the operation surface of the touch sensor 123. The operating object is typically a finger of the user, for example, and is used by the user for inputting operation information. The touch sensor 123 may detect a two-dimensional position or a three-dimensional position of the operating object with respect to the operation surface.

The non-volatile memory 125 stores programs, various calculation parameters, and the like used by the CPU 129. As the non-volatile memory 125, a recording medium such as a ROM (Read Only Memory) and a flash memory can be used.

The RAM 127 temporarily stores programs used in the execution of the CPU 129 and parameters that appropriately change during execution thereof. The CPU 129 functions as an arithmetic processing unit and a control unit and controls the overall operation inside the position information correction device 100 according to various programs. Further, the CPU 129 may be a microprocessor. Note that those pieces of hardware are connected with each other via a host bus configured from a CPU bus or the like.

The hardware configuration that has been described above is a configuration example for realizing respective functions shown in FIG. 3. For example, the display device 121 is controlled by a display control program executed by the CPU 129, and thus, the function of the display section 111 can be realized. Further, the function of the input point acquisition section 101 can be realized by the touch sensor 123.

2.2. Operation Example of Position Information Correction Device 100a

Figure 5:
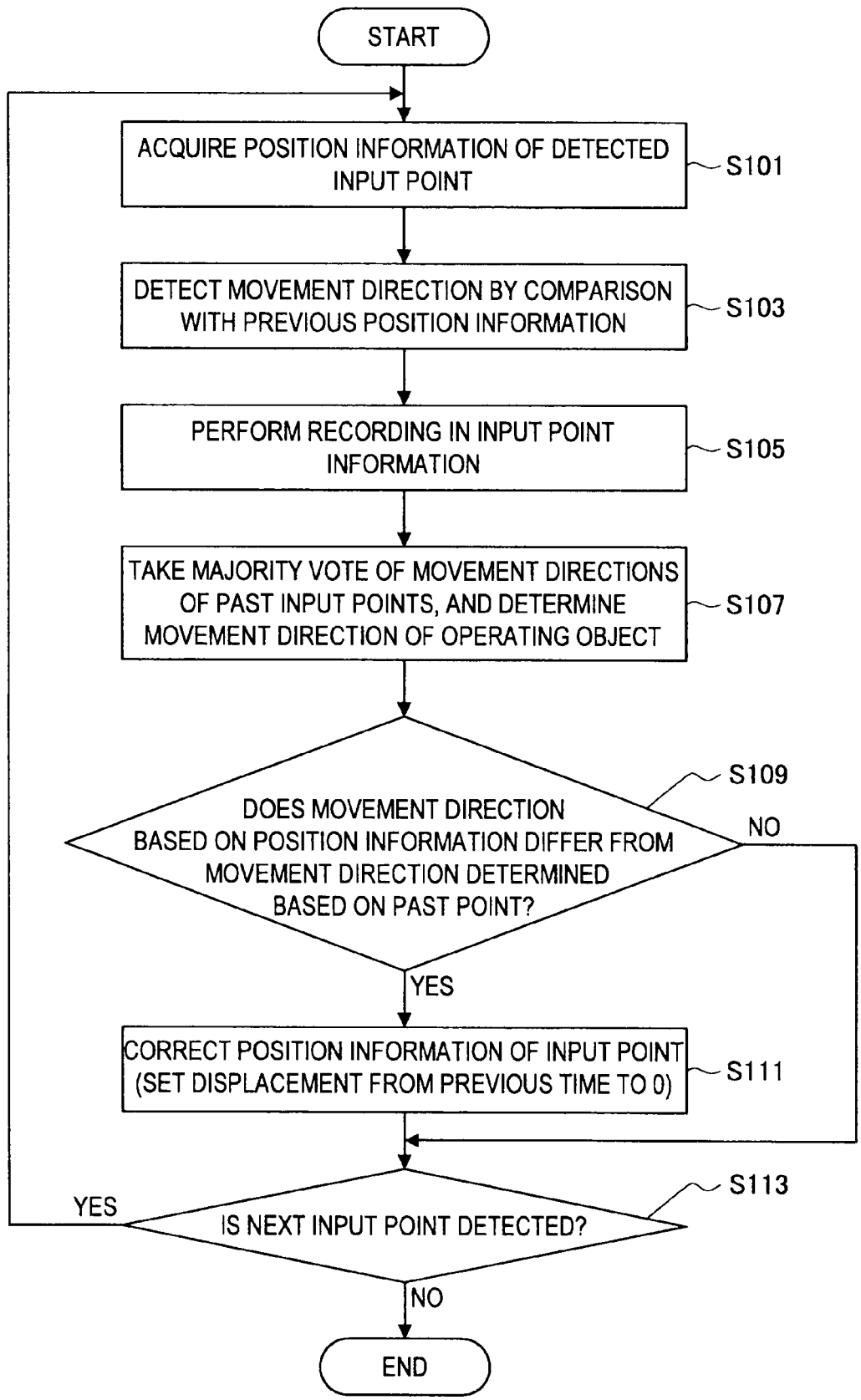
FIG. 5 is a flowchart showing an example of a position information correction method according to the embodiment.

Next, with reference to FIG. 5, there will be described an operation example of the position information correction device 100a realized by the configuration described above. FIG. 5 is a flowchart showing an example of a position information correction method according to the embodiment.

First, the input point acquisition section 101 detects an input point and acquires the position information thereof (S101). Then, the direction detection section 103 compares the acquired position information with the position information of the previous input point, and detects the movement direction (S103). Next, the direction detection section 103 records the position information of the input point and the detected movement direction in input point information (S105).

After that, the determination section 107 takes a majority vote of the movement directions of past input points, and determines the movement direction of the operating object 1 (S107). When the detection of the movement direction performed by the direction detection section 103 and the determination of the movement direction performed by the determination section 107 with respect to the current input point are completed, next, the position information correction section 109 determines whether the movement direction detected by the direction detection section 103 differs from the movement direction determined by the determination section 107 (S109).

In the case where, in the determination of Step S109, the movement direction detected by the direction detection section 103 differs from the movement direction determined by the determination section 107, the position information correction section 109 corrects the position information of the current input point (S111). Here, the position information correction section 109 corrects the position information of the current input point such that the position information of the current input point becomes equal to the position information of the previous input point. On the other hand, in the case where, in the determination of Step S109, the movement direction detected by the direction detection section 103 is the same as the movement direction determined by the determination section 107, Step S111 is omitted.

Then, the input point acquisition section 101 determines whether the next input point is detected (S113), and in the case where the next input point is detected, the processing returns to Step S101. On the other hand, in the case where the next input point is not detected, the processing is completed.

2.3. Examples of Effects

Figure 6:
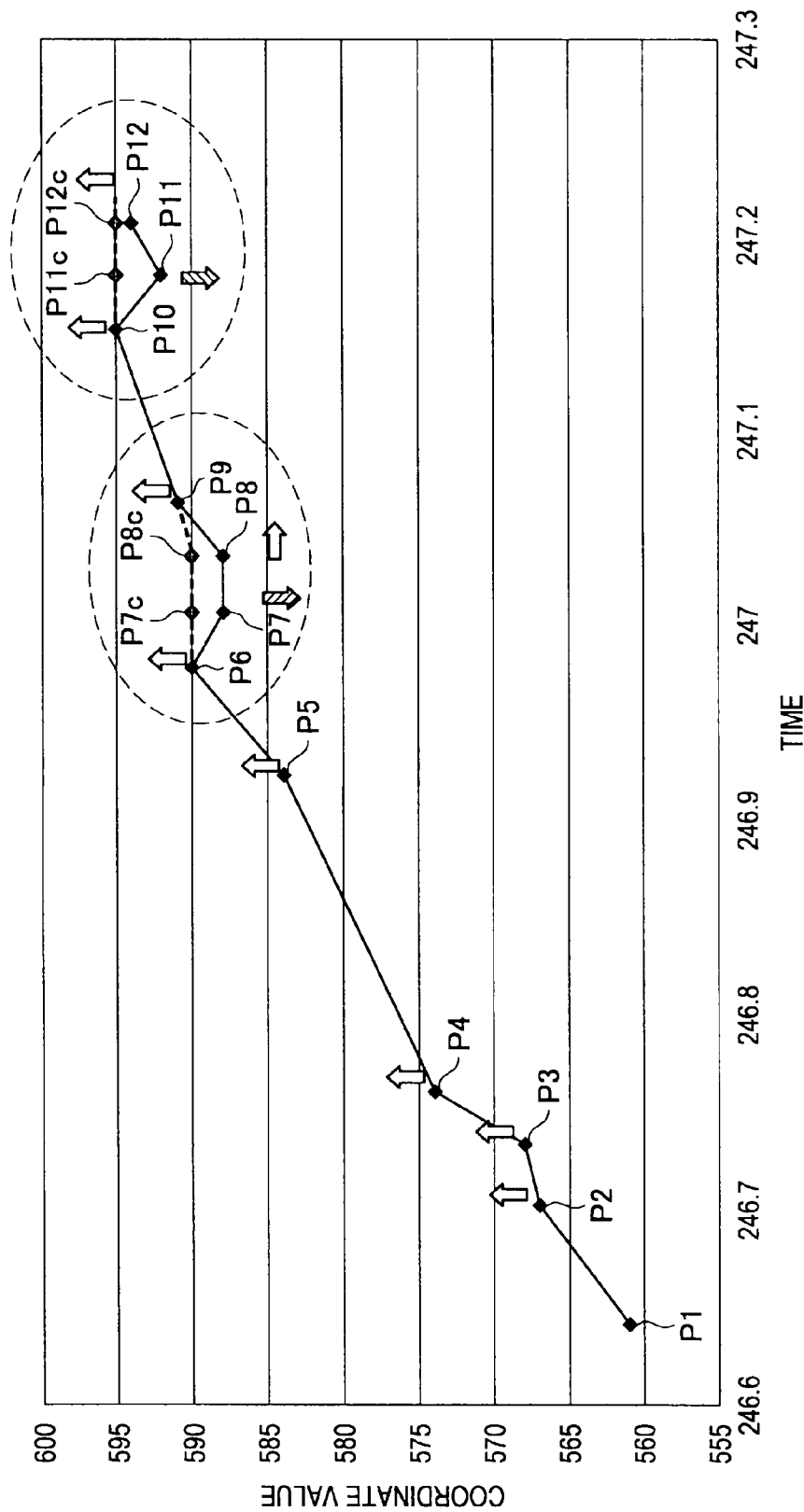
FIG. 6 is a graph showing an example of the position information after position information correction according to the embodiment.

Here, with reference to FIG. 6, an example of effects of the position information correction performed by the position information correction device 100a according to the present embodiment will be described. As shown in FIG. 6, P7, P8, P11, and P12, the movement directions of which are detected as the opposite directions to the originally intended movement directions, respectively, due to the influence of noise included in the pieces of position information of the input points, are corrected (input points after the correction are P7c, P8c, P11c, and P12c) such that the pieces of position information thereof become equal to the pieces of position information of the previous input points, respectively. According to such correction, the possibility can be reduced that the position information moves reversely to the originally intended movement direction.

Note that, in the present embodiment, the description has been made on the example of determining whether the movement direction is the upward direction or the downward direction on the operation surface, but the present technology is not limited thereto. For example, the present technology can be applied to any direction by calculating an approximate movement direction using a past input point, and by taking a majority vote of projection components to the movement direction.

3. Second Embodiment

Figure 7:
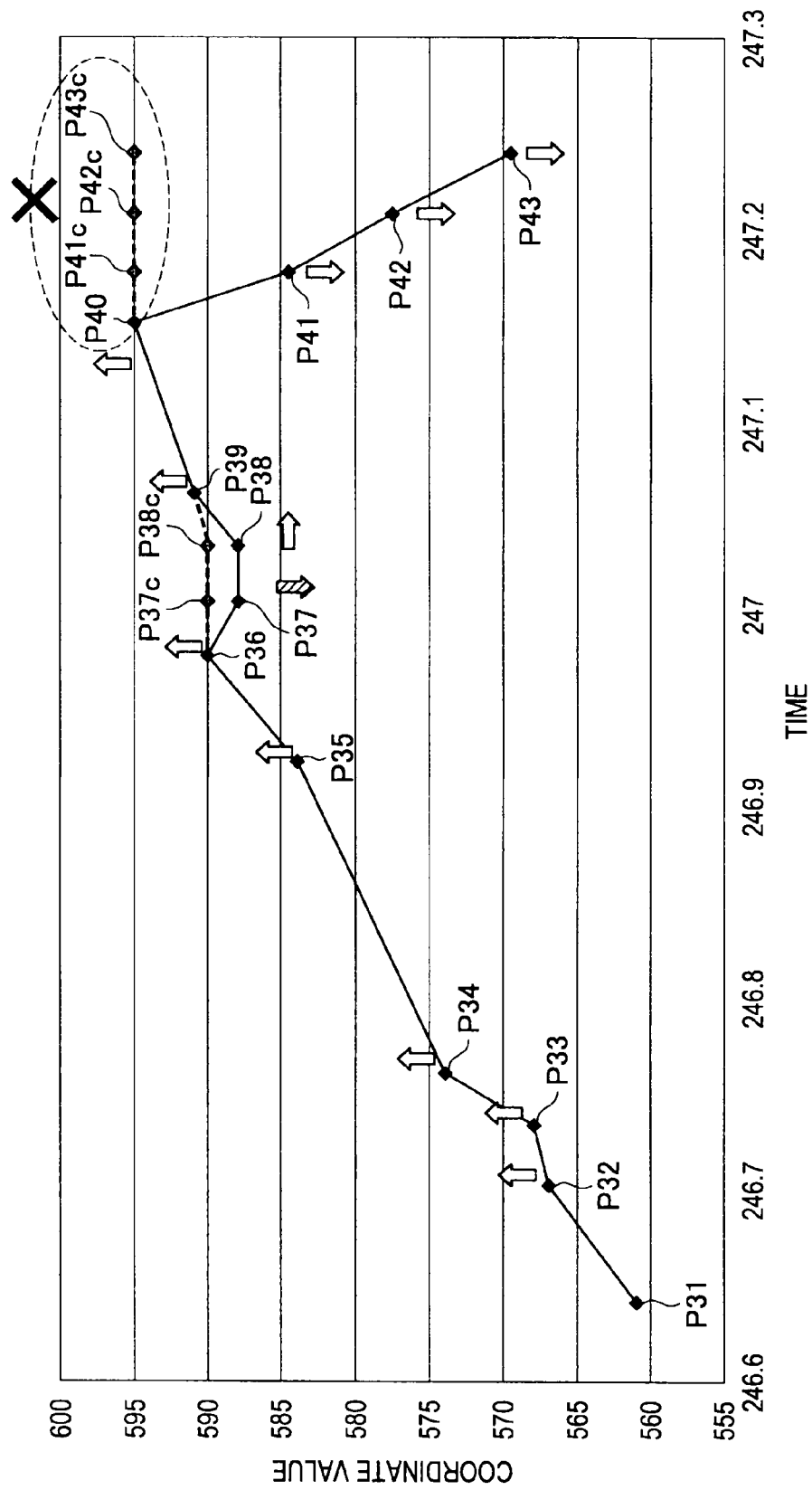
FIG. 7 is a graph showing another example of the position information after the position information correction according to the embodiment.

The configuration of the first embodiment described above has used the pieces of movement direction information of a predetermined number of past input points counted from the latest input point, and has determined the movement direction of the operating object 1 by taking a majority vote. Such a configuration may cause the phenomenon shown in FIG. 7. FIG. 7 is a graph showing another example of the position information after the position information correction according to the first embodiment.

As shown in FIG. 7, let us assume that, in the case where input points P31 to P43 are detected, the user actually moves the operating object 1 in the direction that the coordinate value increases at the time points of detecting P31 to P40, and moves the operating object 1 in the direction that the coordinate value decreases at the time points of detecting P40 to P43. However, if the majority vote of the movement directions of past input points is performed in a simple manner, there may be a case in which the input points P41 to P43, which actually move in the direction that the coordinate value decreases, are corrected to P41c, P42c, and P43c, respectively. Next, there will be described a position information correction device 100b according to a second embodiment of the present disclosure, which suppresses such phenomenon.

3.1. Configuration Example of Position Information Correction Device 100b

Figure 8:
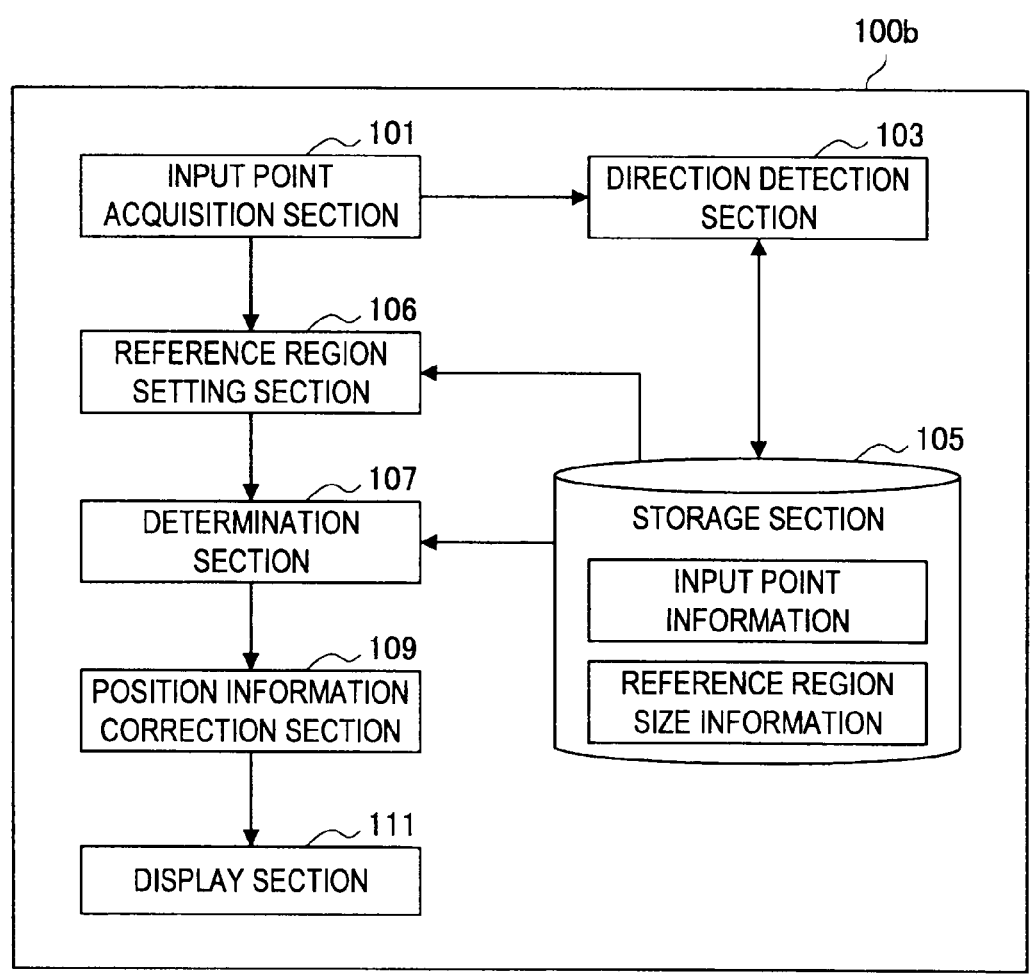
FIG. 8 is a functional block diagram of the position information correction device according to the second embodiment of the present disclosure.

Here, with reference to FIG. 8, the position information correction device 100b according to the second embodiment of the present disclosure will be described. FIG. 8 is a functional block diagram of the position information correction device according to the second embodiment of the present disclosure. The position information correction device 100b according to the second embodiment differs from the position information correction device 100a according to the first embodiment in that the position information correction device 100b according to the second embodiment has a configuration of a reference region setting section 106, and that the determination section 107 takes a majority vote of information of the movement directions of past input points included within a reference region.

The position information correction device 100b has a function of correcting position information input via a pointing device. The position information correction device 100b mainly includes an input point acquisition section 101, a direction detection section 103, a storage section 105, the reference region setting section 106, a determination section 107, a position information correction section 109, and a display section 111.

The input point acquisition section 101 has a function of acquiring position information (for example, coordinate value) of an input point specified by an operating object 1. Here, the operating object 1 represents a pointing device or an object for operating the pointing device (for example, a finger operating a touch sensor), for example. The input point acquisition section 101 can supply the direction detection section 103 with the acquired position information.

The direction detection section 103 has a function of detecting the movement direction of the operating object 1 based on the displacement of the position information acquired by the input point acquisition section 101, for each detected input point. The direction detection section 103 can acquire, as the movement direction of the operating object 1, the direction of change of the position information of the current input point acquired by the input point acquisition section 101 at the current time point from the position information of the previous input point detected immediately prior to the current input point. The direction detection section 103 stores, in the storage section 105, the detected movement direction together with the position information of the corresponding input point.

The storage section 105 has a function of storing data. The storage section 105 may be, for example, a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). In the present embodiment, the storage section 105 can store the input point information, which is a history of the position information of the input point acquired by the input point acquisition section 101. Further, the storage section 105 can store reference region size information, which is information on a reference region for deciding a reference range of past input points used when the determination section 107 determines the movement direction.

The reference region setting section 106 has a function of setting a reference region including the current input point. The reference region setting section 106 may set the reference region having a size in accordance with the device characteristics of the touch sensor. Specifically, the reference region setting section 106 may determine the size of the reference region based on a standard size of the reference region that is written in the reference region size information in advance. It is preferred that the standard size be a larger value as the resolution is lower in accordance with the resolution of the touch sensor. In addition, the reference region size information may include information of the size of the reference region associated with a position in the touch sensor. In this case, the reference region setting section 106 can set the reference region having a size corresponding to the position of the detected input point based on the reference region size information. In this case, it is preferred that the size of the reference region be set such that the size becomes larger as it is at the position in which the noise is more easily included, that is, as it is at the position nearer to a grid of the touch sensor, for example.

Figure 9:
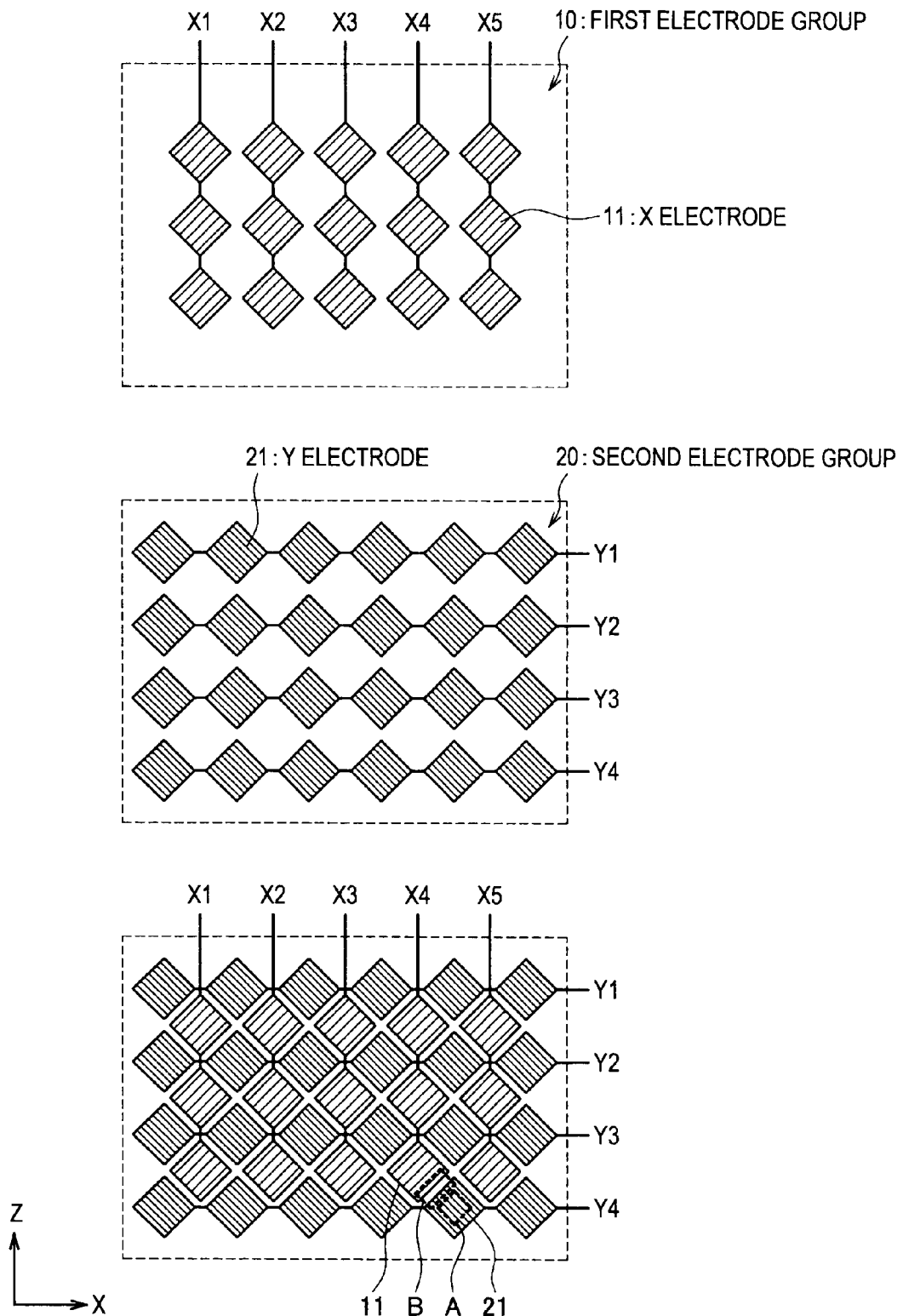
FIG. 9 is an explanatory diagram illustrating an example of reference region size information used in the embodiment.

Here, with reference to FIG. 9, there will be described the size adjustment of the reference region in the case where a capacitive touch sensor is used. FIG. 9 is an explanatory diagram illustrating an example of reference region size information used in the embodiment. In the capacitive touch sensor, as shown in FIG. 9, a first electrode group 10 including a plurality of X electrodes 11 arranged in the X direction and a second electrode group 20 including a plurality of Y electrodes 21 arranged in the Y direction are provided in a stacked manner. The operating object 1 comes into contact with or comes close to the touch sensor having such a configuration, and thus, the position information of the operating object is detected based on the change in capacitance detected by each electrode. In the touch sensor having such a configuration, the noise is more easily included in the position information to be detected in a region B which is near to the boundary between the electrodes compared to the position information to be detected in a region A which is near to the center of the electrode. For this reason, it is preferred that the reference region size information be set such that the size of the reference region becomes larger as it is at the position in which the noise is more easily included, that is, as it is at the position nearer to the grid boundary. The reference region setting section 106 may adjust the size of the reference region in accordance with a position on the touch sensor on the basis of the standard size.

The determination section 107 takes a majority vote of movement directions, which are detected by the direction detection section 103, of the past input points included within the reference region. Then, the determination section 107 can determine the direction with the most votes as the movement direction of the operating object 1 with respect to the current input point detected at the current time point. Further, in the case where there is no past input point within the set reference region, the determination section 107 may determine the movement direction detected by the direction detection section 103 as the movement direction of the operating object 1.

The position information correction section 109 has a function of correcting the position information of the current input point in the case where the movement direction detected by the direction detection section 103 differs from the movement direction determined by the determination section 107. In this case, the position information correction section 109 can correct the position information of the current input point based on the position information of the previous input point that is acquired immediately prior to the current input point. The position information correction section 109 can correct the position information of the current input point such that the position information of the current input point becomes equal to the position information of the previous input point. Alternatively, the position information correction section 109 can correct the position information of the current input point such that the position information of the current input point moves to the movement direction-side from the previous input point, the movement direction being determined by the determination section 107. In this case, the position information correction section 109 may correct the position information of the current input point by estimating the position of the current input point based on movement history of the input point.

The display section 111 includes a display device and a display control section which generates a display screen to be displayed by the display device, for example, and has a function of providing the user with the display screen. The display section 111 can display the screen based on the position information corrected by the position information correction section 109.

Heretofore, an example of the functions of the position information correction device 100b according to the present embodiment has been described. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the position information correction device 100b according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

3.2. Operation Example of Position Information Correction Device 100b

Figure 10:
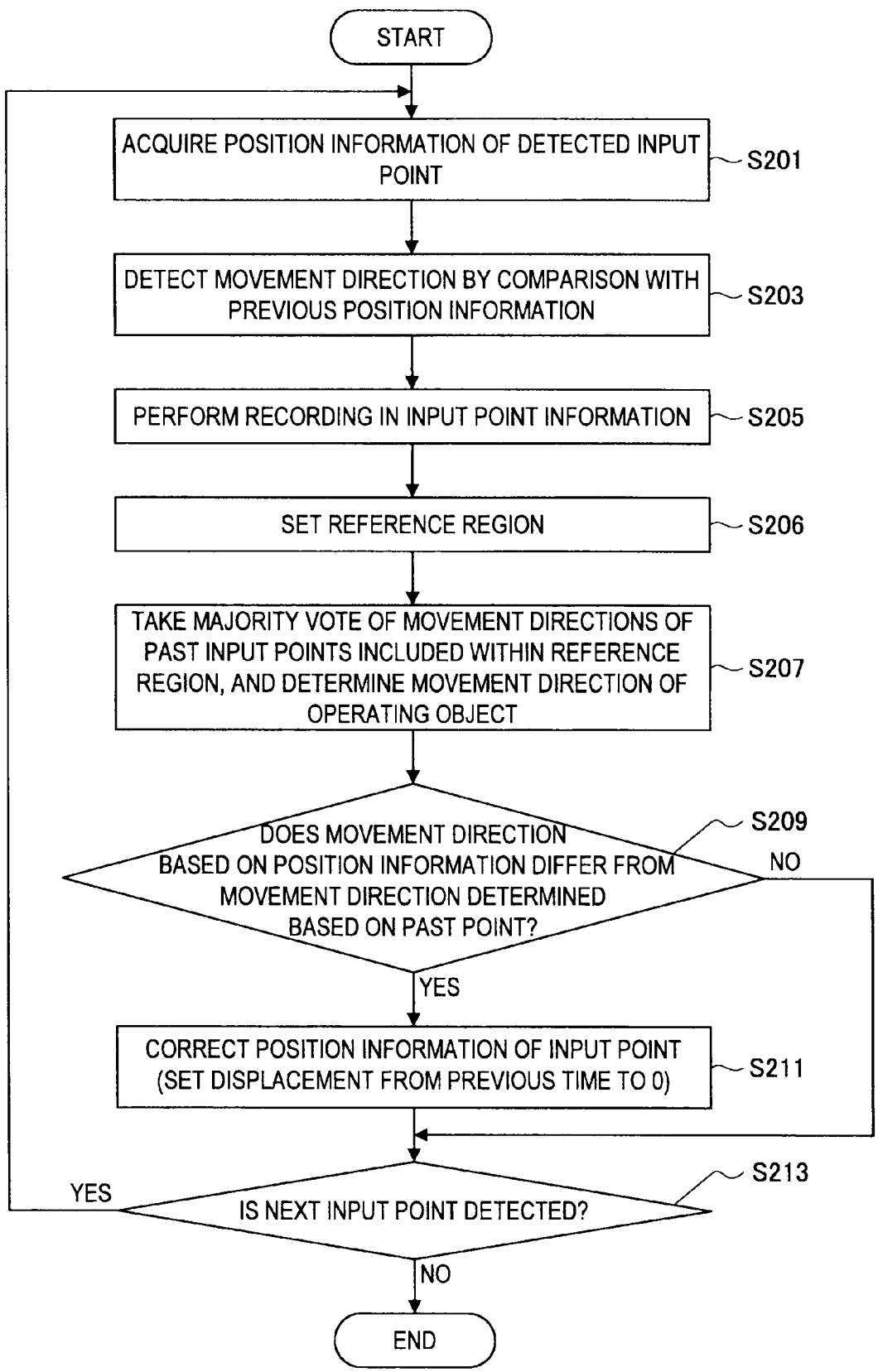
FIG. 10 is a flowchart showing an example of a position information correction method according to the embodiment.

Next, with reference to FIG. 10, there will be described an operation example of the position information correction device 100b realized by the configuration described above. FIG. 10 is a flowchart showing an example of a position information correction method according to the embodiment.

First, the input point acquisition section 101 detects an input point and acquires the position information thereof (S201). Then, the direction detection section 103 compares the acquired position information with the position information of the previous input point, and detects the movement direction (S203). Next, the direction detection section 103 records the position information of the input point and the detected movement direction in input point information (S205).

After that, the reference region setting section 106 sets a reference region for determining a range of input points used for the determination of the movement direction, from among the past input points (S206). In this case, the reference region setting section 106 sets the position of the reference region on the basis of the current input point. The reference region setting section 106 may also set the reference region having a predetermined standard size according to the device characteristics. Further, the reference region setting section 106 may adjust the size of the reference region in accordance with a position of the current input point on the basis of the standard size. In this case, it is preferred that the reference region be larger as the position of the input point is nearer to the grid boundary of the touch sensor.

After that, the determination section 107 takes a majority vote of the movement directions of past input points included within the set reference region, and determines the movement direction of the operating object 1 (S207). At this time, in the case where there is no past input point within the set reference region, the determination section 107 may determine the movement direction detected by the direction detection section 103 as the movement direction of the operating object 1. When the detection of the movement direction performed by the direction detection section 103 and the determination of the movement direction performed by the determination section 107 with respect to the current input point are completed, next, the position information correction section 109 determines whether the movement direction detected by the direction detection section 103 differs from the movement direction determined by the determination section 107 (S209).

In the case where, in the determination of Step S209, the movement direction detected by the direction detection section 103 differs from the movement direction determined by the determination section 107, the position information correction section 109 corrects the position information of the current input point (S211). Here, the position information correction section 109 corrects the position information of the current input point such that the position information of the current input point becomes equal to the position information of the previous input point. On the other hand, in the case where, in the determination of Step S209, the movement direction detected by the direction detection section 103 is the same as the movement direction determined by the determination section 107, Step S211 is omitted.

Then, the input point acquisition section 101 determines whether the next input point is detected (S213), and in the case where the next input point is detected, the processing returns to Step S201. On the other hand, in the case where the next input point is not detected, the processing is completed.

3.3. Examples of Effects

The position information correction device 100b according to the present embodiment has a configuration of, in addition to the configuration of the position information correction device 100a according to the first embodiment, limiting the range used for determining the movement direction to the input points included within the reference region, from among the past input points. In this case, the reference region is set on the basis of the current input point. Accordingly, the past input points that the determination section 107 uses for the determination are limited to those in the vicinity of the current input point. According to such a configuration, the erroneous detection that occurs when the movement direction is changed can be reduced.

4. Third Embodiment

4.1. Configuration Example of Position Information Correction Device 100c In the first and second embodiments described above, the movement direction of the operating object 1 has been determined based on the movement direction of a past input point. A position information correction device 100c according to a third embodiment further estimates the movement distance of the current input point based on the movement distance of the past input point.

Figure 11:
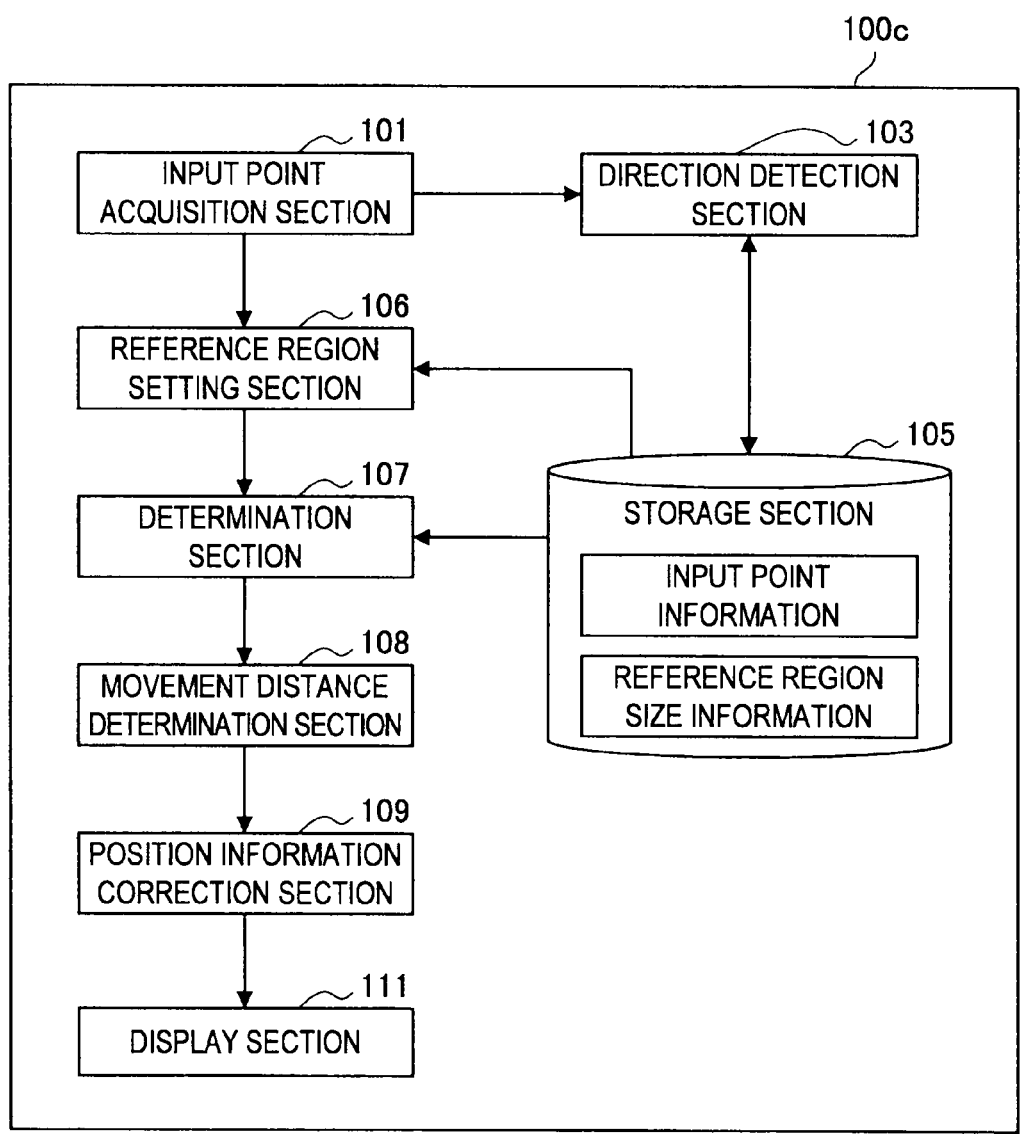
FIG. 11 is a functional block diagram of a position information correction device according to a third embodiment of the present disclosure.

With reference to FIG. 11, the configuration of the position information correction device 100c having such a function will be described. FIG. 11 is a functional block diagram of the position information correction device 100c according to the third embodiment of the present disclosure.

The position information correction device 100c mainly includes an input point acquisition section 101, a direction detection section 103, a storage section 105, a reference region setting section 106, a determination section 107, a movement distance determination section 108, a position information correction section 109, and a display section 111. That is, the position information correction device 100c has a configuration to which the function of the movement distance determination section 108 is added to the configuration of the position information correction device 100b according to the second embodiment.

The input point acquisition section 101 has a function of acquiring position information (for example, coordinate value) of an input point specified by an operating object 1. Here, the operating object 1 represents a pointing device or an object for operating the pointing device (for example, a finger operating a touch sensor), for example. The input point acquisition section 101 can supply the direction detection section 103 with the acquired position information.

The direction detection section 103 has a function of detecting the movement direction of the operating object 1 based on the displacement of the position information acquired by the input point acquisition section 101, for each detected input point. The direction detection section 103 can acquire, as the movement direction of the operating object 1, the direction of change of the position information of the current input point acquired by the input point acquisition section 101 at the current time point from the position information of the previous input point detected immediately prior to the current input point. The direction detection section 103 can store, in the storage section 105, the detected movement direction together with the position information of the corresponding input point.

The storage section 105 has a function of storing data. The storage section 105 may be, for example, a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). In the present embodiment, the storage section 105 can store the input point information, which is a history of the position information of the input point acquired by the input point acquisition section 101. Further, the storage section 105 can store reference region size information, which is information on a reference region for deciding a reference range of past input points used when the determination section 107 determines the movement direction.

The reference region setting section 106 has a function of setting a reference region including the current input point. The reference region setting section 106 may set the reference region having a size in accordance with the device characteristics of the touch sensor. Specifically, the reference region setting section 106 may determine the size of the reference region based on a standard size of the reference region that is written in the reference region size information in advance. It is preferred that the standard size be a larger value as the resolution is lower in accordance with the resolution of the touch sensor. In addition, the reference region size information may include information of the size of the reference region associated with a position in the touch sensor. In this case, the reference region setting section 106 can set the reference region having a size corresponding to the position of the detected input point based on the reference region size information. In this case, it is preferred that the size of the reference region be set such that the size becomes larger as it is at the position in which the noise is more easily included, that is, as it is at the position nearer to a grid of the touch sensor, for example.

The determination section 107 takes a majority vote of movement directions, which are detected by the direction detection section 103, of the past input points included within the reference region. Then, the determination section 107 can determine the direction with the most votes as the movement direction of the operating object 1 with respect to the current input point detected at the current time point. Further, in the case where there is no past input point within the set reference region, the determination section 107 may determine the movement direction detected by the direction detection section 103 as the movement direction of the operating object 1.

The movement distance determination section 108 has a function of determining the movement distance of the current input point based on the movement distance of the past input point. In this case, the movement distance determination section 108 may determine the movement distance of the current input point by taking a majority vote of the movement distances of past input points. In this case, the movement distance determination section 108 can take a majority vote using an approximated movement distance value, and the approximation range may be changed in accordance with the degree of variation of the movement distances. Further, the movement distance determination section 108 may determine the movement distance of the current input point by considering the probability distribution of the current movement distances on the premise that the movement of the operating object 1 is a uniform motion and the error at each point is normally distributed. The detail of the movement distance determination will be described below.

The position information correction section 109 has a function of correcting the position information of the current input point in the case where the movement direction detected by the direction detection section 103 differs from the movement direction determined by the determination section 107. In this case, the position information correction section 109 can correct the position information of the current input point based on the position information of the previous input point that is acquired immediately prior to the current input point. The position information correction section 109 can correct the position information of the current input point such that the position information of the current input point becomes equal to the position information of the previous input point. Alternatively, the position information correction section 109 can correct the position information of the current input point such that the position information of the current input point moves to the movement direction-side from the previous input point, the movement direction being determined by the determination section 107. In this case, the position information correction section 109 may correct the position information of the current input point by estimating the position of the current input point based on movement history of the input point.

The position information correction section 109 further has a function of correcting the position information of the current input point using the movement distance determined by the movement distance determination section 108. The position information correction section 109 may correct the position information using the movement distance determined by the movement distance determination section 108 with respect to all the input points. Alternatively, in the case where the movement direction detected by the direction detection section 103 differs from the movement direction determined by the determination section 107, the position information correction section 109 may correct the position information using the movement distance determined by the movement distance determination section 108.

The display section 111 includes a display device and a display control section which generates a display screen to be displayed by the display device, for example, and has a function of providing the user with the display screen. The display section 111 can display the screen based on the position information corrected by the position information correction section 109.

Heretofore, an example of the functions of the position information correction device 100c according to the present embodiment has been described. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the position information correction device 100c according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

4.2. Operation Example of Position Information Correction Device 100c

Next, with reference to FIG. 12, there will be described an operation example of the position information correction device 100c realized by the configuration described above.

Figure 12:
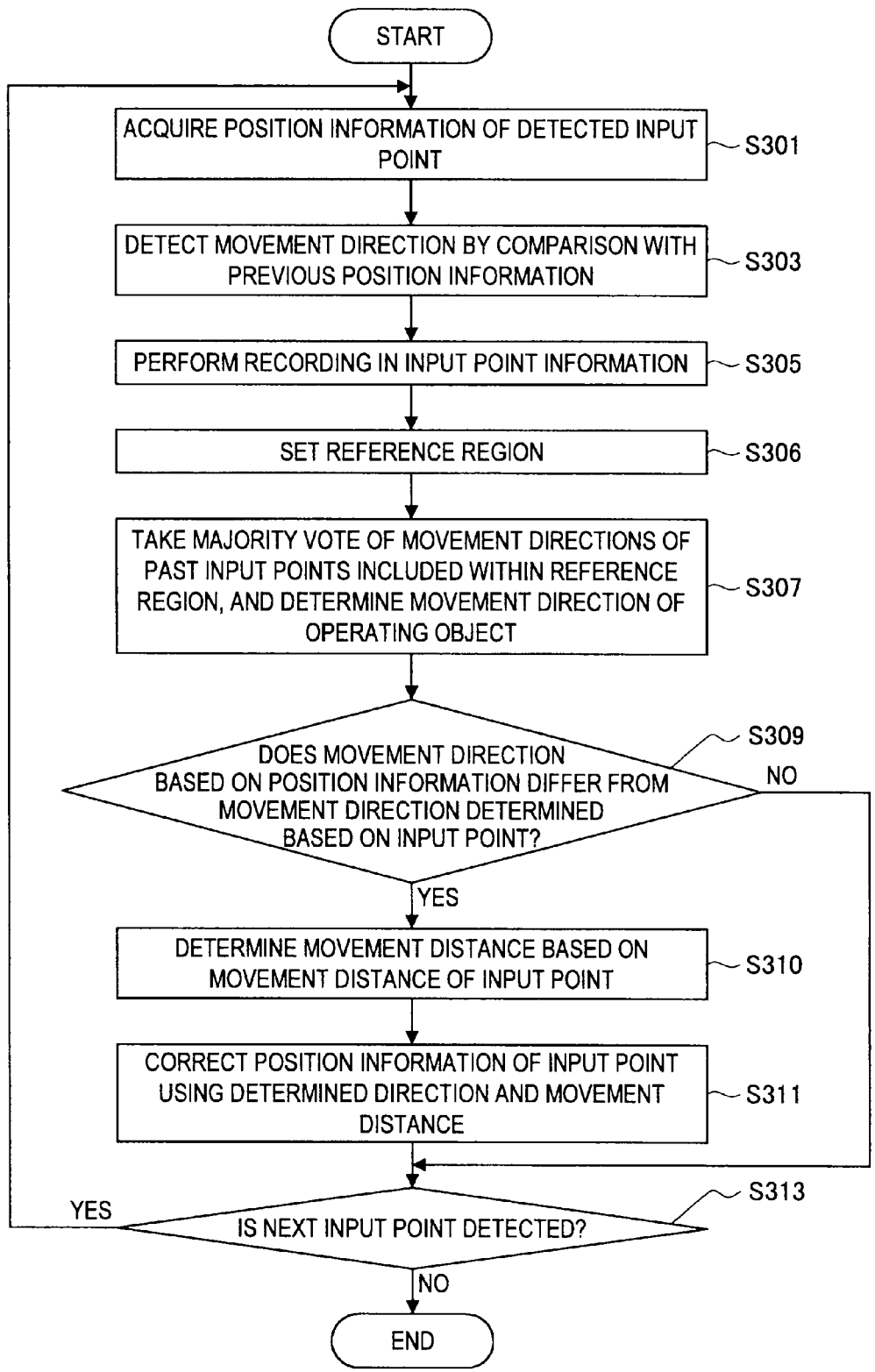
FIG. 12 is a flowchart showing an example of a position information correction method according to the embodiment.

FIG. 12 is a flowchart showing an example of a position information correction method according to the embodiment.

First, the input point acquisition section 101 detects an input point and acquires the position information thereof (S301). Then, the direction detection section 103 compares the acquired position information with the position information of the previous input point, and detects the movement direction (S303). Next, the direction detection section 103 records the position information of the input point and the detected movement direction in input point information (S305).

After that, the reference region setting section 106 sets a reference region for determining a range of input points used for the determination of the movement direction, from among the past input points (S306). In this case, the reference region setting section 106 sets the position of the reference region on the basis of the current input point. The reference region setting section 106 may also set the reference region having a predetermined standard size according to the device characteristics. Further, the reference region setting section 106 may adjust the size of the reference region in accordance with a position of the current input point on the basis of the standard size. In this case, it is preferred that the reference region be larger as the position of the input point is nearer to the grid boundary of the touch sensor.

After that, the determination section 107 takes a majority vote of the movement directions of past input points included within the set reference region, and determines the movement direction of the operating object 1 (S307). At this time, in the case where there is no past input point within the set reference region, the determination section 107 may determine the movement direction detected by the direction detection section 103 as the movement direction of the operating object 1. When the detection of the movement direction performed by the direction detection section 103 and the determination of the movement direction performed by the determination section 107 with respect to the current input point are completed, next, the position information correction section 109 determines whether the movement direction detected by the direction detection section 103 differs from the movement direction determined by the determination section 107 (S309).

In the case where, in the determination of Step S309, the movement direction detected by the direction detection section 103 differs from the movement direction determined by the determination section 107, the movement distance determination section 108 determines the movement distance of the current input point based on the movement distance of the past input point (S310).

Then, the position information correction section 109 corrects the position information of the current input point (S311). Here, the position information correction section 109 uses the movement distance determined by the movement distance determination section 108 and corrects the position information of the current input point. On the other hand, in the case where, in the determination of Step S309, the movement direction detected by the direction detection section 103 is the same as the movement direction determined by the determination section 107, Step S311 is omitted.

Then, the input point acquisition section 101 determines whether the next input point is detected (S313), and in the case where the next input point is detected, the processing returns to Step S301. On the other hand, in the case where the next input point is not detected, the processing is completed.

Figure 13:
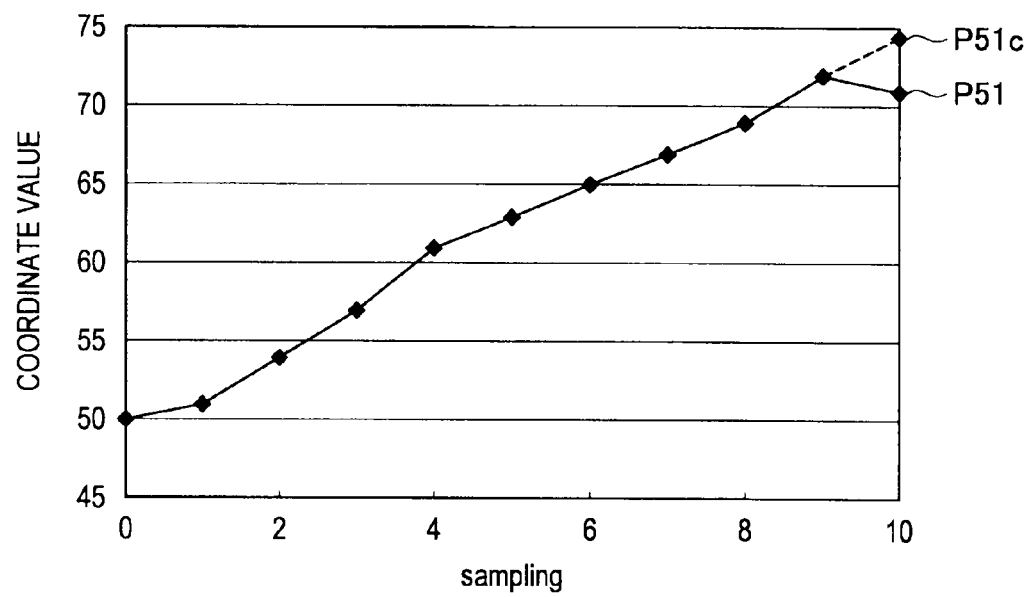
FIG. 13 is an explanatory diagram showing an example of coordinates of an input point to be detected and coordinates of an input point after being corrected using a movement distance determined by a majority vote.
Figure 14:
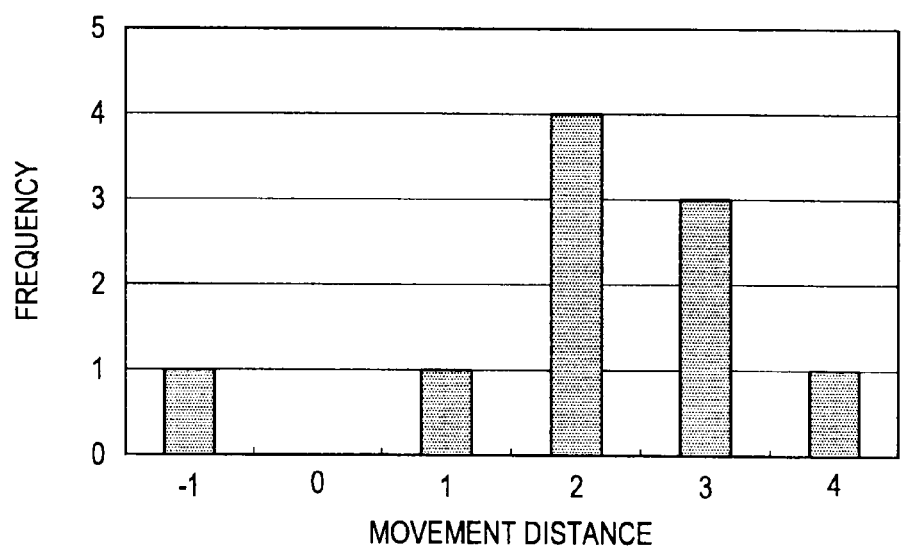
FIG. 14 is an explanatory diagram showing an example of the movement distance determination using a majority vote in the example of FIG. 13.

Here, with reference to FIG. 13 and FIG. 14, an example of the movement distance determination processing of Step S310 will be described in detail. FIG. 13 is an explanatory diagram showing an example of coordinates of an input point to be detected and coordinates of an input point after being corrected using a movement distance determined by a majority vote. FIG. 14 is an explanatory diagram showing an example of the movement distance determination using a majority vote in the example of FIG. 13.

When a detected input point has a coordinate value shown in FIG. 13, the movement distance determination section 108 determines a movement distance of a current input point P51 (sampling No. 10) using movement distances of past input points (sampling Nos. 0 to 9). At that time, the movement distance determination section 108 can determine the movement distance of the current input point P51 by taking a majority vote of the movement distances of past input points. In this case, as shown in FIG. 14, the movement distance "2" having the highest frequency may be set as the movement distance of the current input point. In this case, the position information correction section 109 can correct the input point P51 such that it is shown at an input point P51c.

Figure 15:
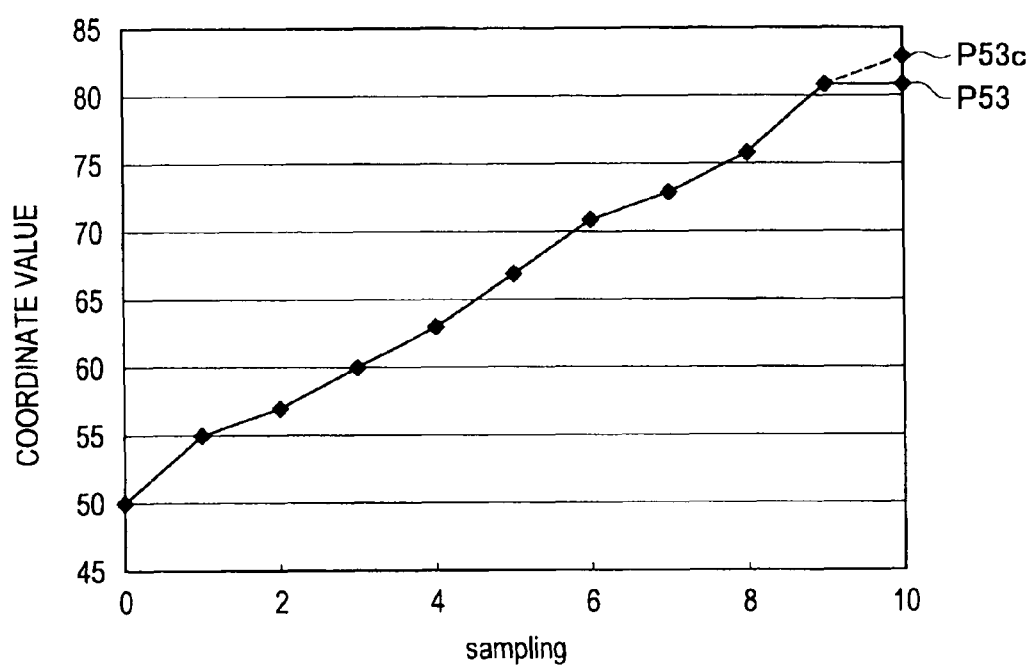
FIG. 15 is an explanatory diagram showing another example of coordinates of an input point to be detected and coordinates of an input point after being corrected using a movement distance determined by a majority vote.

Further, with reference to FIG. 15 and FIG. 16, another example of the movement distance determination processing of Step S310 will be described. FIG. 15 is an explanatory diagram showing another example of coordinates of an input point to be detected and coordinates of an input point after being corrected using a movement distance determined by a majority vote. FIG. 16 is an explanatory diagram showing an example of the movement distance determination using a majority vote in the example of FIG. 15.

When a detected input point has a coordinate value shown in FIG. 15, the movement distance determination section 108 determines a movement distance of a current input point P53 (sampling No. 10) using movement distances of past input points (sampling Nos. 0 to 9). At that time, the movement distance determination section 108 may take a majority vote of movement distances at a segment width corresponding to the degree of variation of movement distances of past input points. When the movement distances vary, there may be cases where the movement distance tendency is not shown if the segment width is too small, but the tendency as a whole may be shown by selecting an appropriate segment width. In this case, the tendency of movement distance becomes clear when a majority vote is taken every 2 units of movement distance as shown in the bottom diagram of FIG. 16 rather than when a majority vote is taken every 1 unit of movement distance as shown in the upper diagram of FIG. 16, and hence, the movement distance determination section 108 can set the movement distance "2" as the movement distance of the current input point.

Figure 17:
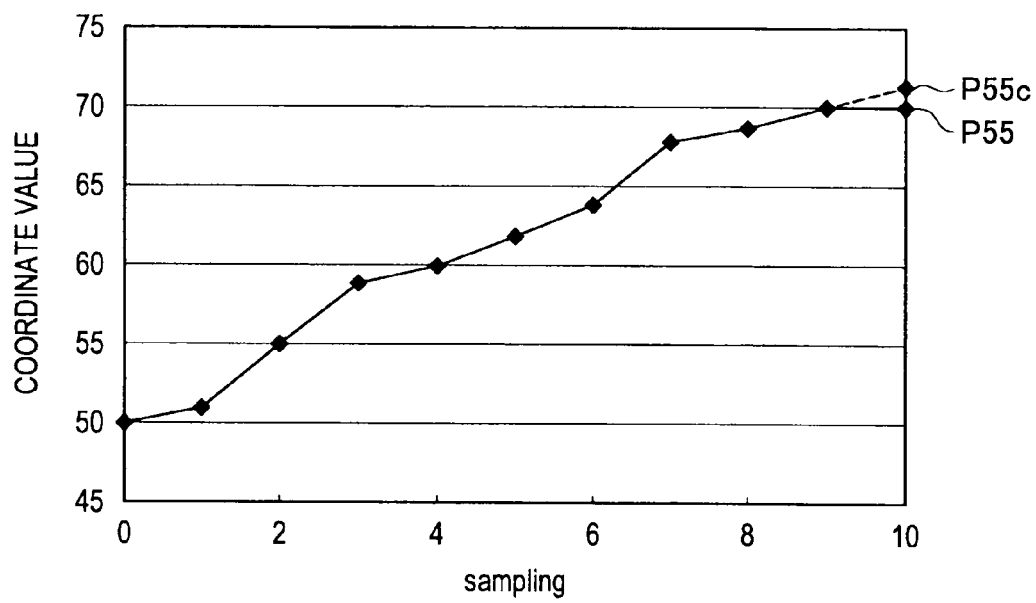
FIG. 17 is an explanatory diagram showing an example of coordinates of an input point to be detected and coordinates of an input point after being corrected using a movement distance determined by a probability distribution.
Figure 18:
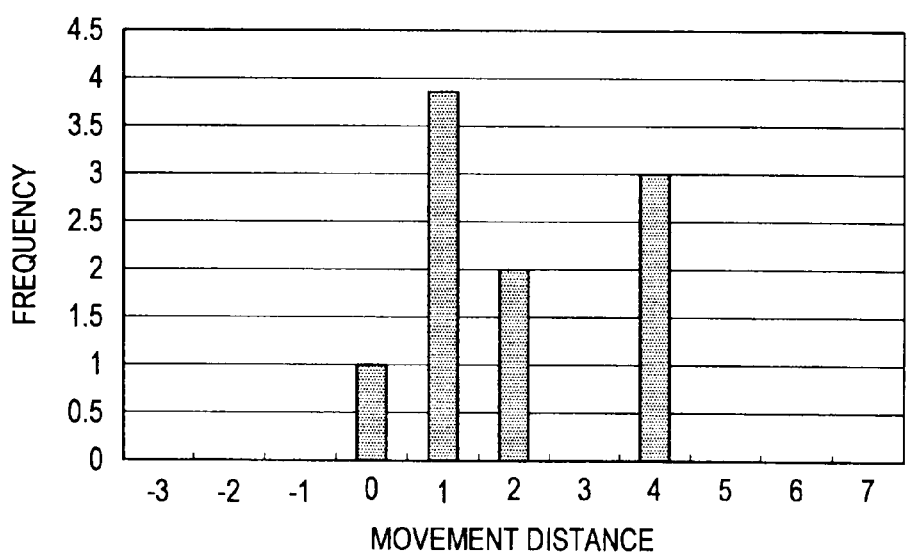
FIG. 18 is an explanatory diagram showing an example of the movement distance determination using a majority vote in the example of FIG. 17.
Figure 19:
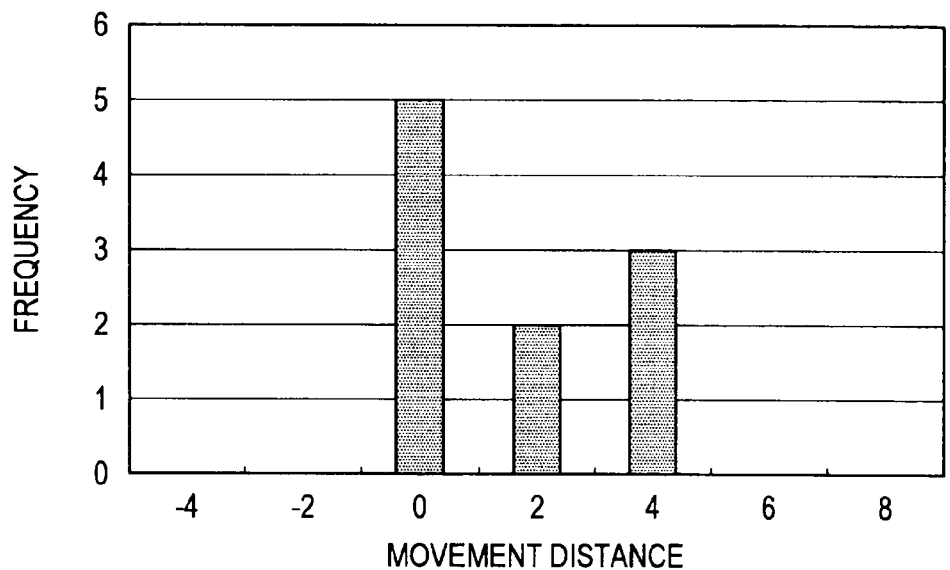
FIG. 19 is an explanatory diagram showing another example of the movement distance determination using a majority vote in the example of FIG. 17.
Figure 20:
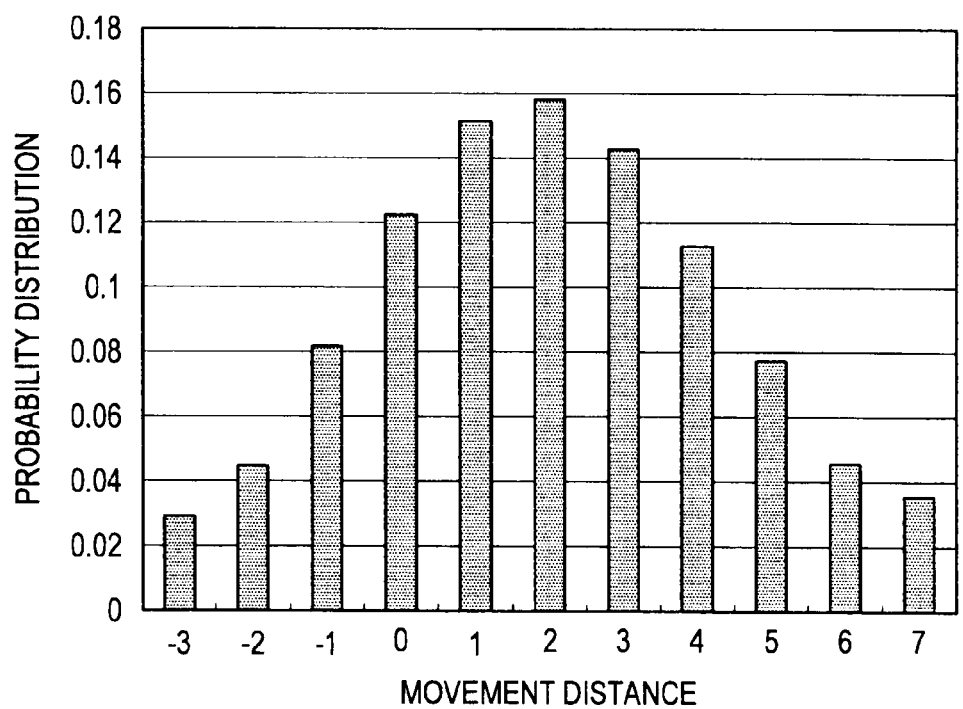
FIG. 20 is an explanatory diagram showing an example of the movement distance determination using a probability distribution in the example of FIG. 17.

Further, with reference to FIGS. 17 to 20, another example of the movement distance determination processing of Step S310 will be described. FIG. 17 is an explanatory diagram showing an example of coordinates of an input point to be detected and coordinates of an input point after being corrected using a movement distance determined by a probability distribution. FIG. 18 is an explanatory diagram showing an example of the movement distance determination using a majority vote in the example of FIG. 17. FIG. 19 is an explanatory diagram showing another example of the movement distance determination using a majority vote in the example of FIG. 17. FIG. 20 is an explanatory diagram showing an example of the movement distance determination using a probability distribution in the example of FIG. 17.

For example, in the case where the movement of the operating object 1 is a uniform motion, the movement distance is 2, and each point includes a noise of 2, the coordinate value of each input point may be detected as shown in FIG. 17. In this case, in a method of taking a majority vote of the movement distances of past input points, for example, the movement distances vary as shown in FIG. 18, and hence, it is difficult to find a tendency of the movement distance. Further, even in the case where the segment width is changed, it is difficult to find a correct tendency of the movement distance as shown in FIG. 19.

Accordingly, the movement distance determination section 108 may use the probability distribution of movement distances and may determine the movement distance of the current input point. In this case, the movement distance determination section 108 uses the following Equations (1) to (3) and calculates the probability distribution of the movement distances of the current input point. Then, based on the probability distribution, the movement distance having the highest probability distribution value may be set as the movement distance of the current input point.

$$f(v_i) = \sum_{j=1}^{N_{sample}} \exp\left(-\frac{(v_i - v_j)^2}{2\sigma_{v_j}^2}\right) \quad \text{Equation (1)}$$

$$v_j = x_j - x_{j-1} \quad \text{Equation (2)}$$

$$\sigma_{v_j} = \sqrt{\sigma_{x_j}^2 + \sigma_{x_{j-1}}^2} \quad \text{Equation (3)}$$

Here, $f(v_j)$ represents the probability of being $v_j$, $N_{sample}$ represents the number of samples to be referred to, $x_j$ represents j-th coordinates, $v_j$ represents the j-th speed, $\sigma_{x_j}$ represents the amount of noise at the j-th coordinates, and $\sigma_{v_j}$ represents the error of the j-th speed.

The probability distribution is calculated as shown in FIG. 20, and the movement distance can be introduced stably. In this case, the movement distance determination section 108 can set the movement distance "2" having the highest probability distribution value as the movement distance of the current input point.

4.3. Examples of Effects

According to such a configuration, the position information correction device 100c can determine the movement distance of the current input point based on the movement distance of the past input point. Even in the case where the user intends to move the operating object 1 in a fixed direction at fixed speed in doing a scroll operation or the like, noise is included in the position information of the detected input point in many cases. However, according to the above configuration, the position information correction device 100c can reflect the operation input of the movement direction and the movement distance of the user's intention on the device operation.

Additionally, the present technology may also be configured as below.

(1) A position information correction device including:

an input point acquisition section which acquires position information of an input point specified by an operating object;

a direction detection section which detects a movement direction of the operating object based on displacement of the position information acquired by the input point acquisition section for each input point;

a determination section which takes a majority vote of the movement directions, which are detected by the direction detection section, of past input points acquired by the input point acquisition section in the past, and determines the movement direction of the operating object with respect to a current input point acquired by the input point acquisition section at a current time point; and a position information correction section which, when the movement direction detected by the direction detection section differs from the movement direction determined by the determination section, corrects position information of the current input point.

(2) The position information correction device according to (1), further including a reference region setting section which sets a reference region including the current input point, wherein the determination section determines the movement direction of the operating object based on a movement direction of a past input point included within the reference region.

(3) The position information correction device according to (2), wherein the input point acquisition section acquires position information of the operating object that comes into contact with or comes close to a touch sensor, and wherein the reference region setting section sets the reference region having a size in accordance with device characteristics of the touch sensor.

(4) The position information correction device according to (2) or (3), wherein the reference region setting section sets the reference region having a predetermined size in accordance with a resolution of the touch sensor.

(5) The position information correction device according to any one of (2) to (4), wherein the touch sensor is a capacitive touch sensor, and wherein the reference region setting section increases a size of the reference region as the reference region is nearer to a grid boundary of the touch sensor.

(6) The position information correction device according to (1), wherein the position information correction section corrects the position information of the current input point based on position information of an input point that is acquired immediately prior to the current input point.

(7) The position information correction device according to (6), wherein the position information correction section corrects the position information in a manner that the position information of the current input point becomes equal to the position information of the input point that is acquired immediately prior to the current input point.

(8) The position information correction device according to (1), further including a movement distance determination section which determines a movement distance of the current input point based on a movement distance of a past input point, wherein the position information correction section corrects the position information of the current input point using the movement distance determined by the movement distance determination section.

(9) The position information correction device according to (8), wherein the movement distance determination section determines the movement distance of the current input point by taking a majority vote of the movement distances of the past input points.

(10) The position information correction device according to (9), wherein the movement distance determination section determines the movement distance of the current input point by taking a majority vote of the movement distances of the past input points at a segment width corresponding to a degree of variation of the movement distances of the past input points.

(11) The position information correction device according to (8), wherein the movement distance determination section calculates a probability distribution of movement distances of the current input point based on the movement distance of the past input point, and sets a movement distance having the highest probability distribution as the movement distance of the current input point.

(12) A position information correction method including:

acquiring position information of an input point specified by an operating object;

detecting a movement direction of the operating object based on displacement of the acquired position information for each input point;

taking a majority vote of the detected movement directions of past input points acquired in the past, and determining the movement direction of the operating object with respect to a current input point acquired at a current time point; and correcting position information of the current input point when the detected movement direction differs from the determined movement direction.

(13) A program for causing a computer to function as a position information correction device which includes an input point acquisition section which acquires position information of an input point specified by an operating object, a direction detection section which detects a movement direction of the operating object based on displacement of the position information acquired by the input point acquisition section for each input point, a determination section which takes a majority vote of the movement directions, which are detected by the direction detection section, of past input points acquired by the input point acquisition section in the past, and determines the movement direction of the operating object with respect to a current input point acquired by the input point acquisition section at a current time point, and a position information correction section which, when the movement direction detected by the direction detection section differs from the movement direction determined by the determination section, corrects position information of the current input point.

It should be understood by those skilled in the art that various modifications, combinations, sub-combinations and alterations may occur depending on design requirements and other factors insofar as they are within the scope of the appended claims or the equivalents thereof.

For example, in the embodiments described above, the touch sensor has been exemplified as the pointing device, but the present technology is not limited to such an example. For example, the present technology can be applied to a mouse, and a general pointing device using various types of sensors.

Note that in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

The present disclosure contains subject matter related to that disclosed in Japanese Priority Patent Application JP 2011-060590 filed in the Japan Patent Office on Mar. 18, 2011, the entire content of which is hereby incorporated by reference.

What is claimed is:

1. A position information correction device comprising:
circuitry configured to:
acquire position information of one or more input points specified by an operating object;
detect a movement direction of the operating object based on displacement of the position information acquired for each of the one or more input points;
determine the movement direction of the operating object at a current input point of the one or more input points by taking a majority vote of movement directions of the operating object at past input points of the one or more input points; and
correct the position information of the current input point when the detected movement direction of the operating object is different from the determined movement direction of the operating object.

2. The position information correction device according to claim 1, wherein the circuitry is configured to:
set a reference region including the current input point, and
determine the movement direction of the operating object based on a movement direction of a past input point of the one or more input points included within the reference region.

3. The position information correction device according to claim 2, wherein the circuitry acquires position information of the operating object that comes into contact with or comes close to a touch sensor, and sets the reference region having a size in accordance with device characteristics of the touch sensor.

4. The position information correction device according to claim 2, wherein the circuitry sets the reference region having a predetermined size in accordance with a resolution of the touch sensor.

5. The position information correction device according to claim 2, wherein the touch sensor is a capacitive touch sensor, and the circuitry increases a size of the reference region as the reference region is nearer to a grid boundary of the touch sensor.

6. The position information correction device according to claim 1, wherein the circuitry corrects the position information of the current input point based on the position information of an input point that is acquired immediately prior to the current input point.

7. The position information correction device according to claim 6, wherein the circuitry corrects the position information in a manner that the position information of the current input point becomes equal to the position information of the input point that is acquired immediately prior to the current input point.

8. The position information correction device according to claim 1, wherein the circuitry is configured to:
determine a movement distance of the current input point based on a movement distance of one of the past input points, and
correct the position information of the current input point using the movement distance determined.

9. The position information correction device according to claim 8, wherein the circuitry determines the movement distance of the current input point by taking a majority vote of movement distances of the past input points.

10. The position information correction device according to claim 9, wherein the circuitry determines the movement distance of the current input point by taking a majority vote of the movement distances of the past input points at a segment width corresponding to a degree of variation of the movement distances of the past input points.

11. The position information correction device according to claim 8, wherein the circuitry calculates a probability distribution of movement distances of the current input point based on the movement distance of the one of the past input points, and sets a movement distance having the highest probability distribution as the movement distance of the current input point.

12. A position information correction method comprising:
acquiring position information of one or more input points specified by an operating object;
detecting a movement direction of the operating object based on displacement of the acquired position information for each of the one or more input points;
determining the movement direction of the operating object at a current input point of the one or more input points by taking a majority vote of movement directions of the operating object at past input points of the one or more input points; and
correcting the position information of the current input point when the detected movement direction of the operating object is different from the determined movement direction of the operating object.

13. A non-transitory computer-readable medium encoded with computer-readable instructions thereon that, when executed by a computer, cause the computer to perform a method comprising:
acquiring position information of one or more input points specified by an operating object;
detecting a movement direction of the operating object based on displacement of the position information acquired for each of the one or more input points;
determining the movement direction of the operating object at a current input point of the one or more input points by taking a majority vote of movement directions of the operating object at past input points of the one or more input points; and
correcting the position information of the current input point when the detected movement direction of the operating object is different from the determined movement direction of the operating object.

* * * * *